(12) United States Patent
Kuhnert (10) Patent No.: US 9,067,473 B2
(45) Date of Patent: Jun. 30, 2015

(54) FAN ARRANGEMENT

(75) Inventor: Gerhard Kuhnert, VS-Villingen (DE)

(73) Assignee: EBM-PAPST ST. GEORGEN GmbH & Co. KG, St. Georgen (DE)

( * ) Notice: Subject to any disclaimer, the term of this patent is extended or adjusted under 35 U.S.C. 154(b) by 519 days.

(21) Appl. No.: 13/522,333

(22) PCT Filed: Jul. 28, 2011

(86) PCT No.: PCT/EP2011/003777
§ 371 (c)(1),
(2), (4) Date: Jul. 16, 2012

(87) PCT Pub. No.: WO2012/019712
PCT Pub. Date: Feb. 16, 2012

(65) Prior Publication Data
US 2013/0011240 A1    Jan. 10, 2013

(30) Foreign Application Priority Data

Aug. 10, 2010 (DE) .................... 20 2010 011 429 U
Feb. 22, 2011 (DE) .................... 20 2011 003 007 U (51) Int. Cl.
| | |
|---|---|
| *F04D 17/00* | (2006.01) |
| *F04D 19/00* | (2006.01) |
| *F04D 29/00* | (2006.01) |
| *B60H 1/00* | (2006.01) |
| *F04D 29/16* | (2006.01) |

(Continued)

(52) U.S. Cl.
CPC .......... *B60H 1/00471* (2013.01); *F04D 29/161* (2013.01); *F04D 29/541* (2013.01); *F04D 29/601* (2013.01)

(58) Field of Classification Search
CPC ... F04D 29/161; F04D 29/541; F04D 29/601; B60H 1/00471
See application file for complete search history.

(56) References Cited

U.S. PATENT DOCUMENTS 6,497,112 B1 * 12/2002 Simeone et al. ................. 62/407
6,523,128 B1    2/2003 Stapleton et al. ............. 713/330

(Continued)

FOREIGN PATENT DOCUMENTS

DE    10 2005-004 450 A    8/2006
DE    10 2008-026 692 A    12/2009

(Continued)

OTHER PUBLICATIONS

EBM-PAPST company profile, Wikipedia, retrieved Jul. 16, 2012 from www.wikipedia.org.

(Continued)

*Primary Examiner* — Igor Kershteyn
(74) *Attorney, Agent, or Firm* — Milton Oliver, Esq.; Oliver Intellectual Property LLC (57) ABSTRACT

A blower arrangement having n fans, where n>1, has a housing arrangement for receiving said fans (24, 26, 28). The housing arrangement features
a) a first housing part (22) having flow-through openings (76) that are each associated with one of the fans, and having at least one installation opening (78) through which a fan can be introduced into said first housing part (22) and can be mounted in the region of the associated flow-through opening (76); and
b) a second housing part (40) that is connected, on one side, to the first housing part (22) on the side thereof having the at least one installation opening (78), and, on the other side, defines an air exit opening (42).

20 Claims, 13 Drawing Sheets

(51) Int. Cl.
  *F04D 29/54* (2006.01)
  *F04D 29/60* (2006.01)

(56) References Cited

U.S. PATENT DOCUMENTS

| | | | |
|---|---|---|---|
| 6,560,713 B1 | 5/2003 | Chary | 713/300 |
| 6,669,555 B2 | 12/2003 | Stauter et al. | 454/299 |
| 7,050,959 B1 | 5/2006 | Pollard et al. | 703/21 |
| 2003/0037912 A1 | 2/2003 | Stauter et al. | 165/122 |

FOREIGN PATENT DOCUMENTS

| | | |
|---|---|---|
| EP | 2138334 A1 | 12/2009 |
| JP | 61-257317 A | 11/1986 |
| JP | 01-115720 A | 5/1989 |
| JP | 05-278442 A | 10/1993 |
| JP | 07-248654 A | 9/1995 |
| JP | 09-175144 A | 7/1997 |
| JP | 2002-356109 A | 12/2002 |
| JP | 2003-025875 A | 1/2003 |
| JP | 2008-081029 A | 4/2008 |
| WO | WO 2006-081945 A1 | 8/2006 |

OTHER PUBLICATIONS

PAPST BASICS catalog L856E excerpts, PAPST-MOTOREN, circa 2003; pp. 1, 3, 4, 10 & 108.

\* cited by examiner

FAN ARRANGEMENT

CROSS-REFERENCE TO RELATED APPLICATIONS

This application is a section 371 of PCT/EP11/03777, filed Jul. 28, 2011, published Feb. 16, 2012 as WO-2012-019 712-A1, and further claims priority from my German applications DE 20 2010 011 429.2 and DE 20 2011 003 007.5, the entire contents of which are hereby incorporated by reference.

FIELD OF THE INVENTION

The invention relates to a blower arrangement having fans.

BACKGROUND

Trays in which multiple fans are arranged in a kind of drawer are known, for cooling in telephone and broadcast facilities. Such arrangements make it easy to replace defective fans, but require a great deal of space that is not available in many applications. Such trays are also heavy, which is undesirable for mobile applications, since it increases energy consumption.

In motor vehicles, a single radial blower that has a corresponding size in all three spatial directions is usually used for ventilation. In small cars, especially, it can be difficult to find an installation space for it. This is true in particular for hybrid vehicles with their large and heavy batteries, which can become very hot during operation and must then be efficiently cooled.

SUMMARY OF THE INVENTION

It is therefore an object of the invention to make available a novel blower arrangement.

This object is achieved by a structure including a first housing part and a second housing part, coupled together, the first housing part being configured for mounting a plurality of fans therein, and the second housing part being configured to direct a flow of output air from the plurality of fans.

The blower arrangement has n fans, where n>1, has a housing arrangement for receiving said fans, which housing arrangement comprises a first housing part having flow-through openings that are each associated with a respective one of the fans, and has at least one installation opening, through which a fan can be introduced into said first housing part and can be mounted adjacent the associated flow-through opening; and a second housing part that is connected on one side to the first housing part on the side thereof having the at least one installation opening, and on the other side has an air exit opening.

This makes it possible to accommodate multiple fans in a small space. These can be fans of a standard design, so that they are inexpensive and can easily be swapped out and replaced if defective. Individual fans can also be switched on or off as needed, for example via a control bus.

Distributing the fan output over a plurality of smaller fans makes it possible to adapt the shape of the housing parts very individually to the installation space available, for example using a wound design, which makes possible a large variety of shapes and allows the available space to be utilized very effectively. Low weight and good efficiency are also achievable.

The first housing part is preferably implemented in wound fashion, at least in portions. The fans are preferably implemented as "equipment fans" that each have an associated electric motor to drive them. The second housing part is preferably implemented for attachment of a filter, electrical devices to be cooled, or the like. The second housing part is preferably implemented in wound fashion. The fans preferably comprise fan wheels that are each rotatable around a rotation axis, and the rotation axes of at least some of said fan wheels extend at an angle to one another that is different from parallelism. The fans are preferably implemented, at least in part, as radial fans. The fans are preferably implemented, at least in part, as axial fans.

A preferred refinement an electrical switching and control arrangement, according to which the fans can be switched on individually or in groups.

The capability of controlling or switching on the fans individually makes it possible, in cases in which a low air flow rate is required, to save energy by switching off some of the fans.

At least some of the fans preferably have resonant frequencies differing from one another. The blower arrangement is preferably equipped with user-specific peripheral components. The blower arrangement is preferably arranged in the region of the instrument panel of a motor vehicle, in order to cool the electronic devices located there, the wound implementation of the first housing part being adapted to the space conditions in the region of the instrument panel. The blower arrangement preferably handles cooling tasks in a motor vehicle, the wound implementation of the first housing part being adapted to the space conditions in the motor vehicle. At least some of the fans are preferably arranged in the first housing part on an associated base.

A shared filter element is preferably associated with the air inlets of at least some of the fans. A support member for the filter element is preferably provided between the filter and the air inlets. The filter is preferably arranged in a filter housing that is arranged removably on the first housing part. In the second housing part, a separate discharge conduit is associated with at least one of the fans. At least one air-directing vane is preferably provided at the outlet of a discharge conduit, in order to control the volumetric flow rate flowing through said discharge conduit during operation. Preferably n>2.

According to a preferred embodiment, a motor vehicle has a blower arrangement of this kind.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION

Figure 1:
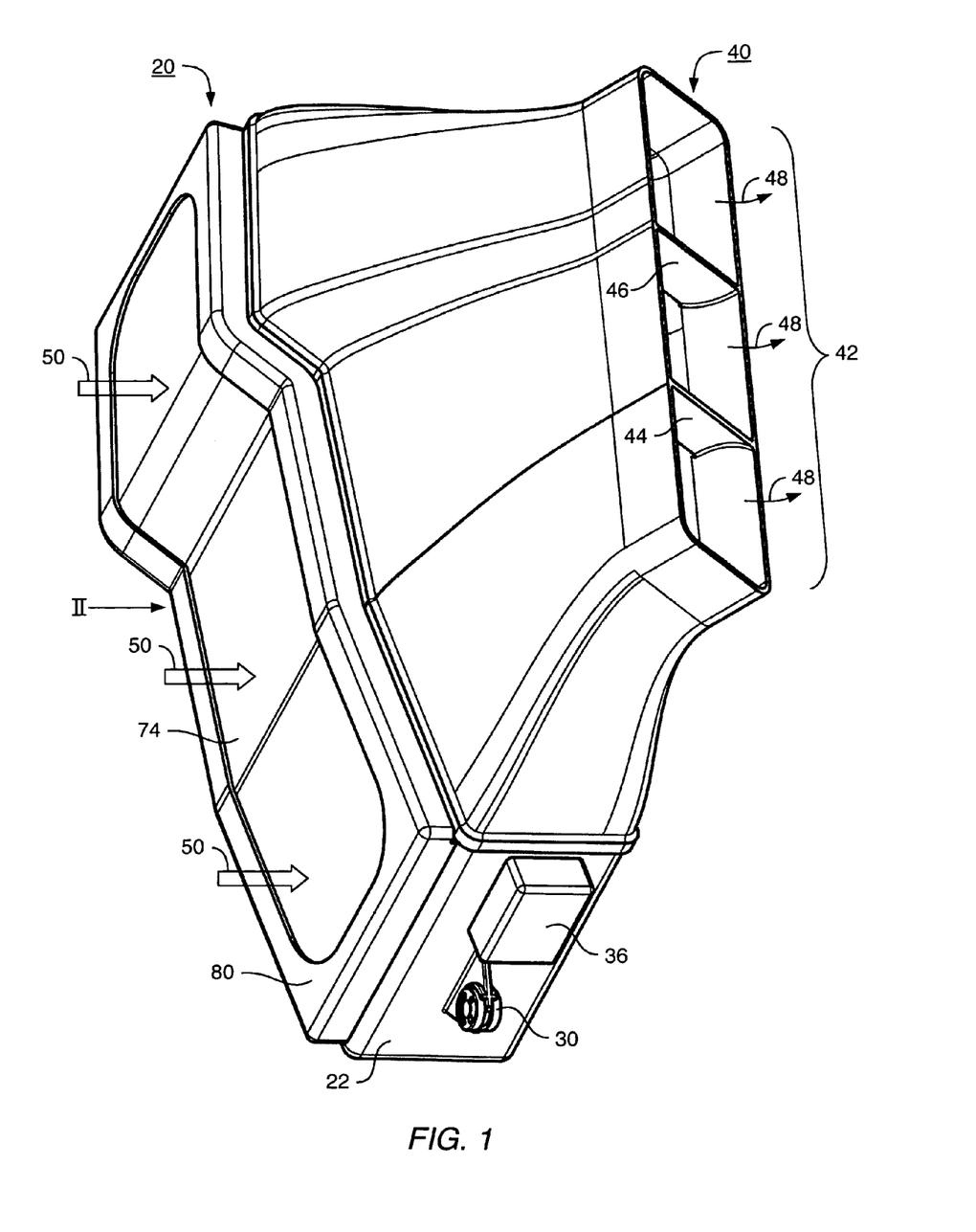
FIG. 1 is a three-dimensional depiction of a blower arrangement (20) in which air is taken in at a first housing part (22) through a filter (74), and discharged through a second housing part (40) and delivered or applied, for example, to an object to be cooled.
Figure 2:
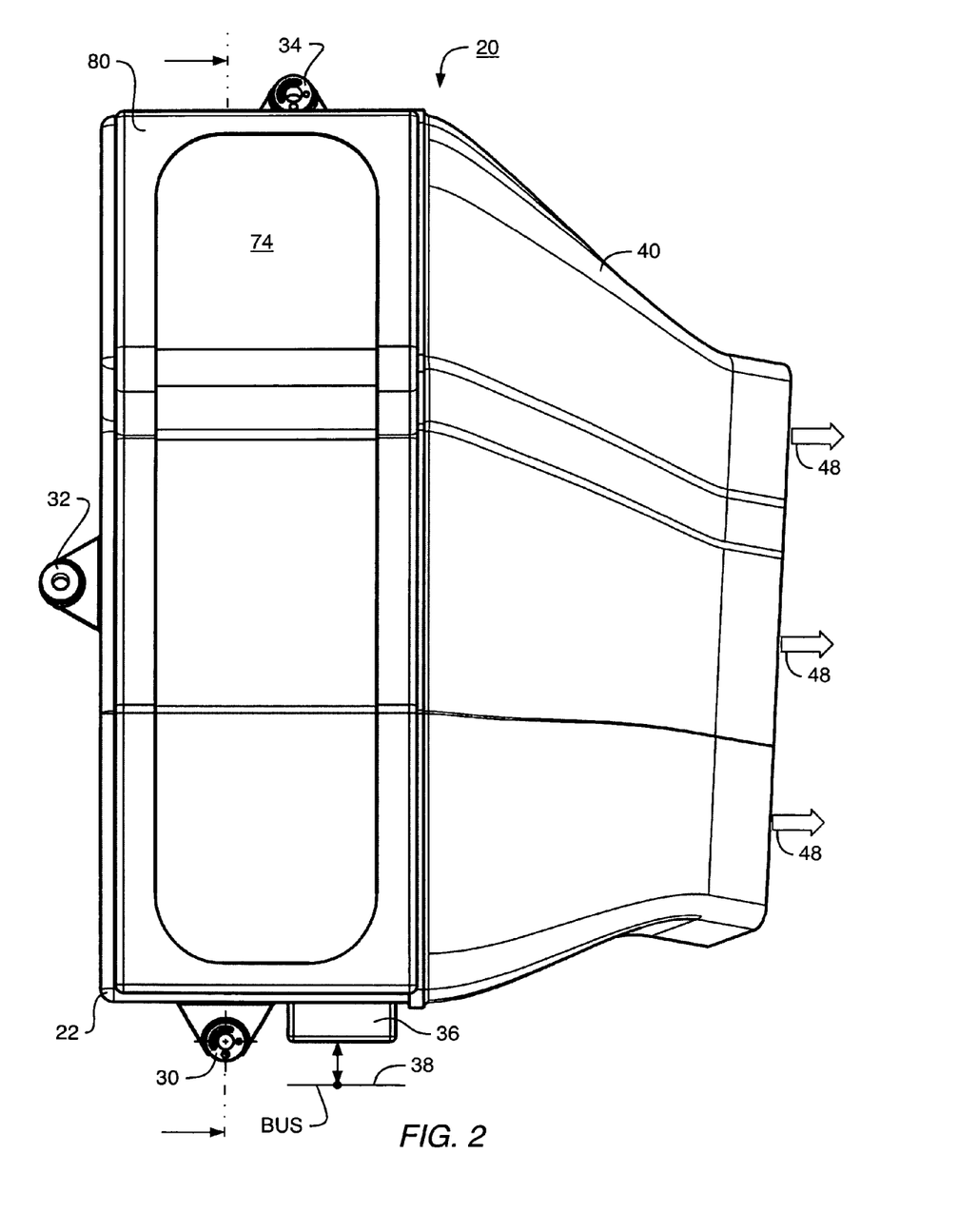
FIG. 2 is a plan view looking along arrow II of FIG. 1.
Figure 3:
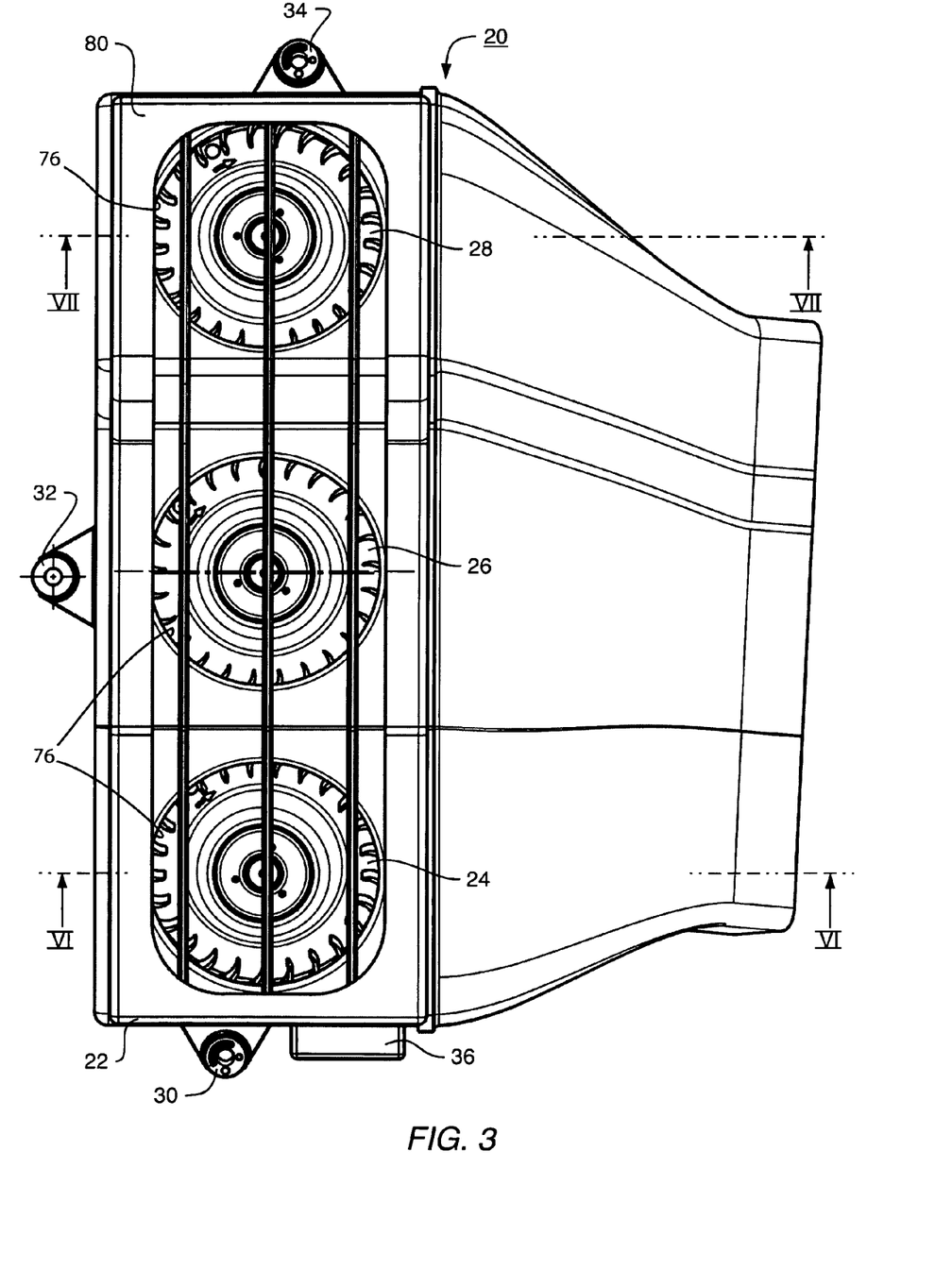
FIG. 3 is a depiction analogous to FIG. 2 that does not, however, depict the air filter.

FIG. 1 and FIG. 2 show the very compact external shape of a blower arrangement 20. The latter has a first housing part 22 in which are arranged, as depicted in FIG. 3, three radial fans 24, 26, 28 whose rotation direction (UZS) is indicated by arrows. On the exterior of first housing part 22, for example, three vibration-damping mounts 30, 32, 34 can be provided, with which first housing part 22 can be mounted at any desired location. These mounts reduce the transmission of solid-borne sound. A switch box 36 is also mounted on first housing part 22. Said box contains electronic components (not shown) that serve, for example, for connection to a control bus 38 with which fans 24, 26, 28 can be controlled. There are various kinds of such control buses, which are familiar to one skilled in the art.

These components can also serve to adjust fans 24, 26, 28 to somewhat different rotation speeds, in order to reduce acoustic effects, such as resonances.

Located to the right of first housing part 22 in FIG. 1 is a second housing part 40 that, in this exemplifying embodiment, has only the function of conveying the air delivered by fans 24, 26, 28 to an outlet 42; air-directing vanes 44, 46 are provided in order to coordinate the volumetric flow rate generated by the individual fans 24, 26, 28 so as to avoid overloading individual fans. Air, symbolized by arrows 50 (FIG. 1), is taken in by fans 24, 26, 28 through flow-through openings 76 (FIG. 3). The air flowing out is symbolized by arrows 48, and the air taken in is symbolized by arrows 50. If axial fans are used, the direction of motion of the air can also be reversed, for which purpose the rotation direction of the axial fan wheels is then reversed, via bus 38.

Figure 4:
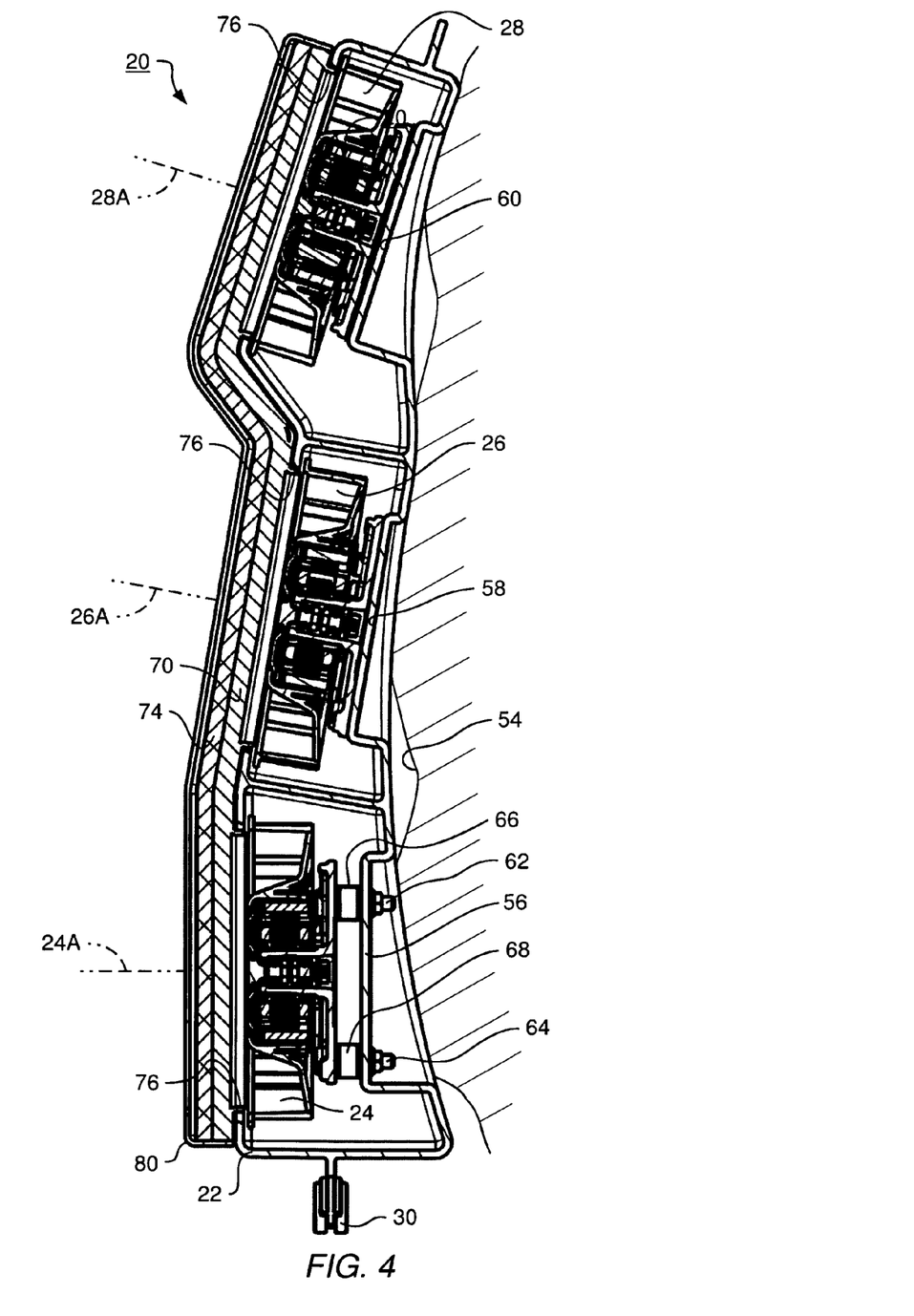
FIG. 4 is a section looking along line IV-IV of FIG. 2.
Figure 5:
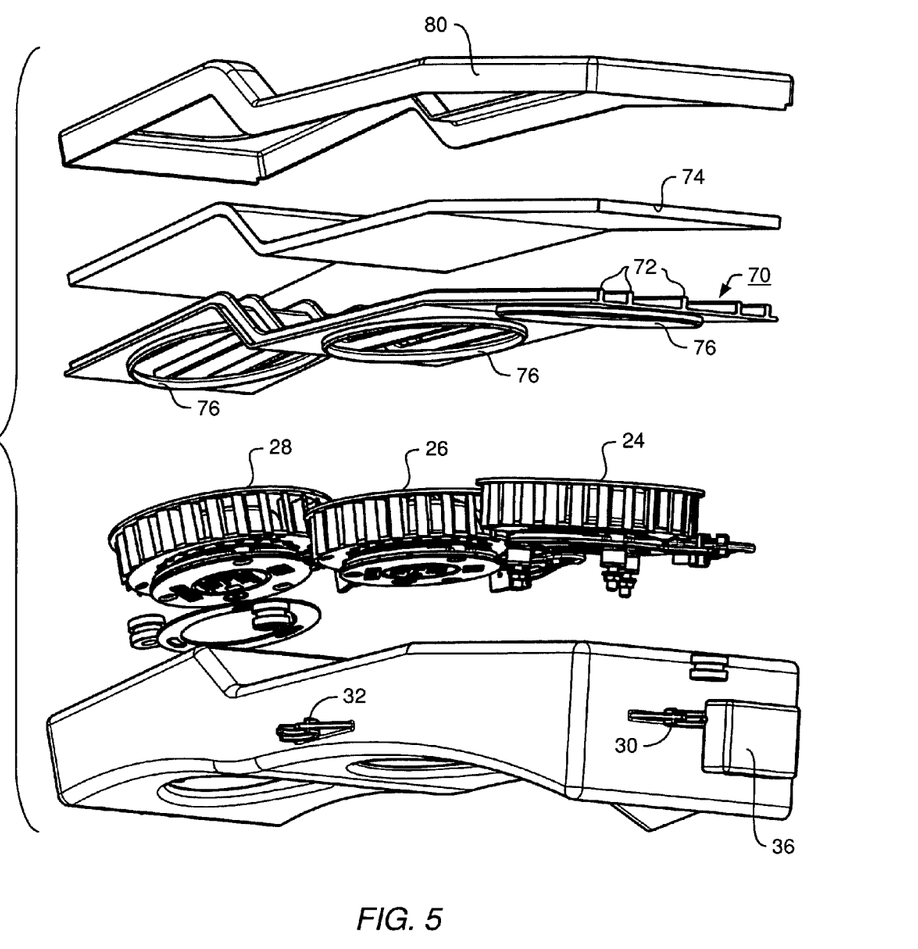
FIG. 5 is an exploded view of the first housing part.

As FIG. 1, FIG. 4, and FIG. 5 clearly show, first housing part 22 is shaped so that it is, for example, optimally adapted to the shape of cavity 54 of a vehicle (not shown), which cavity is defined, for example, by an instrument panel, by the components arranged adjacent the underside of the instrument panel, or the like, as indicated in FIG. 4 as part of the vehicle. The shape of cavity 54 here is, for example, concave, but could also be flat or convex.

It is very advantageous that adaptation to the shape of wound and molded cavities is also possible.

The electric motors provided for driving fans 24, 26, 28 are visible in FIG. 4.

Figure 6:
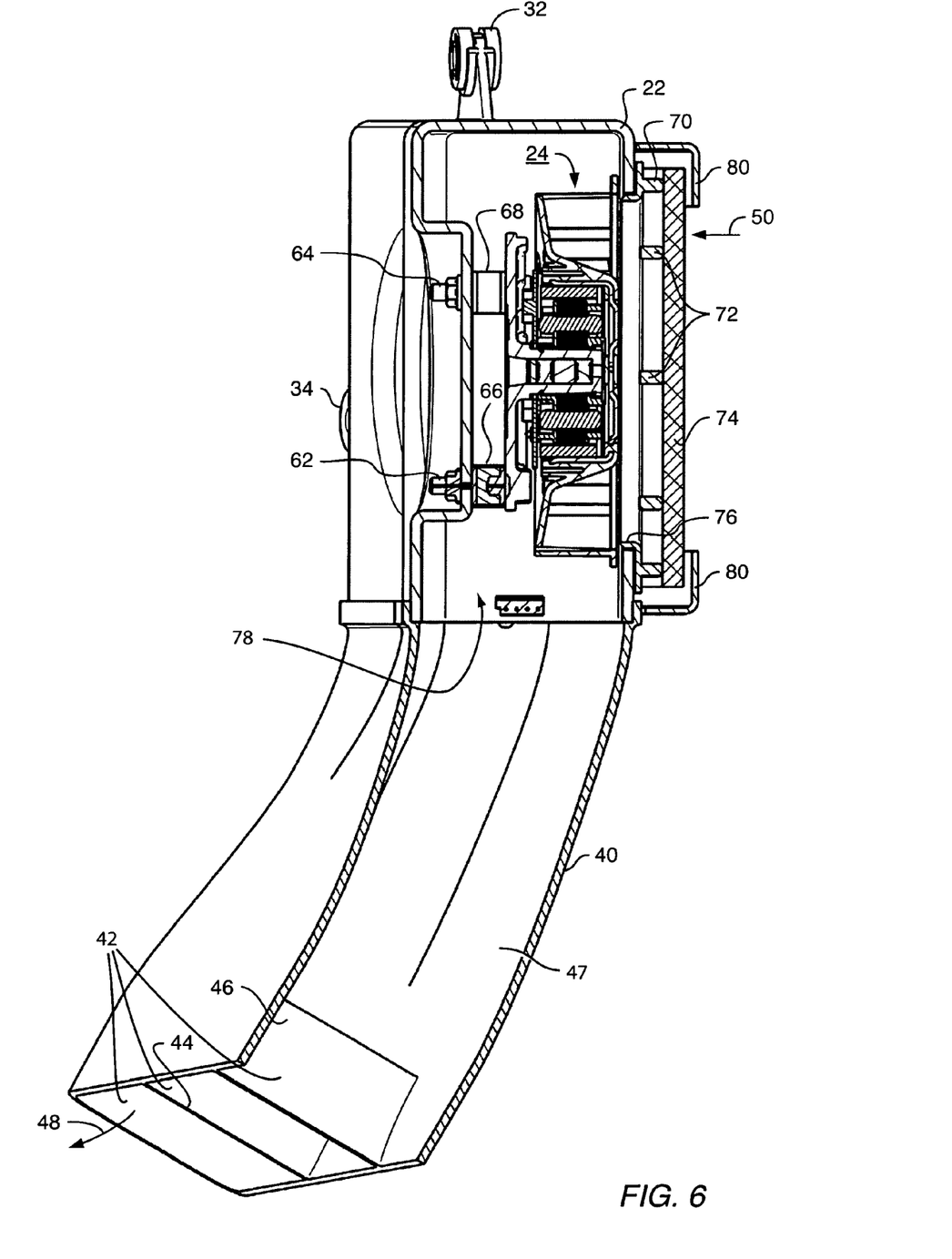
FIG. 6 is a section looking along line VI-VI of FIG. 3.

Bases 56, 58, 60 are provided for this purpose in first housing part 22. Fan 24 is mounted on base 56, for example, by means of screws 62, 64 and rubber buffers 66, 68 (see also FIG. 6). Other mounting and decoupling means are also possible, such as rubber clip connections. Fan 26 is mounted on base 58, and fan 28 on base 60. Each individual fan can thereby be spatially oriented in the desired manner, in accordance with local requirements, e.g. in a vehicle.

The fans depicted are radial fans, but other types of fans can also be used, if necessary.

As is clearly apparent from FIG. 4, rotation axes 24A, 26A, 28A of the three fans 24, 26, 28, or of the fan wheels, do not need to extend parallel to one another. For example, rotation axis 26A could extend perpendicular to rotation axis 24A, and rotation axis 28A could extend, for example, perpendicular to rotation axis 26A.

Figure 7:
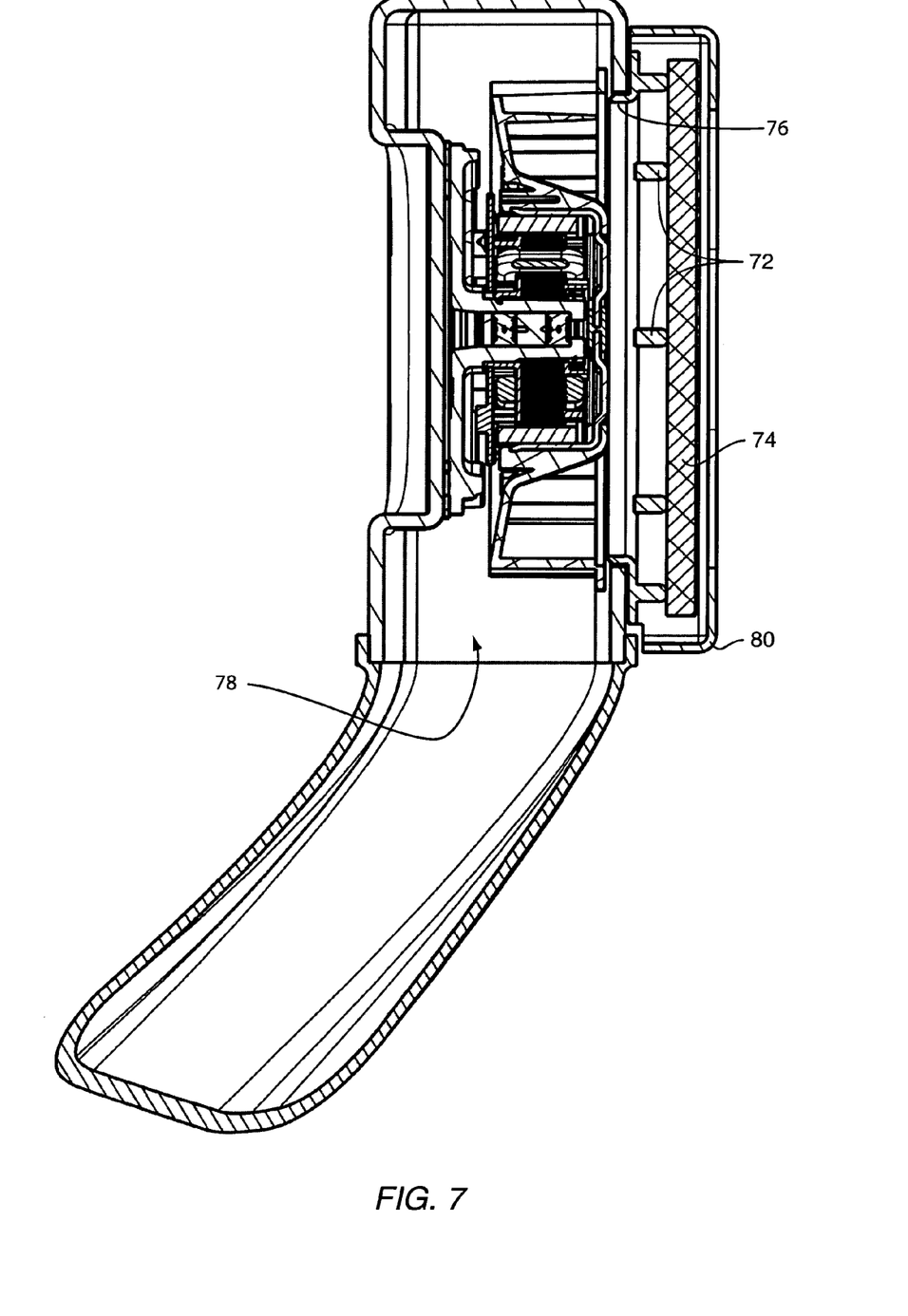
FIG. 7 is a section looking along line VII-VII of FIG. 3.

A support element 70 in the form of a grid is mounted on the inlet side of the three fans 24, 26, 28. It has longitudinal ribs 72 (see FIG. 3 and FIG. 7). These serve to support a filter element 74, so that the latter cannot be sucked in by the fan wheels. Support element 70 furthermore has three cutouts (flow-through openings, air inlets) 76 (FIG. 4) through which air can flow into fans 24, 26, 28.

Filter element 74 is releasably retained by a filter housing 80 so that it can be replaced. The shape of filter housing 80 is adapted to the shape of first housing part 22 (see FIG. 4), and presses the latter against support element 70.

Figure 8:
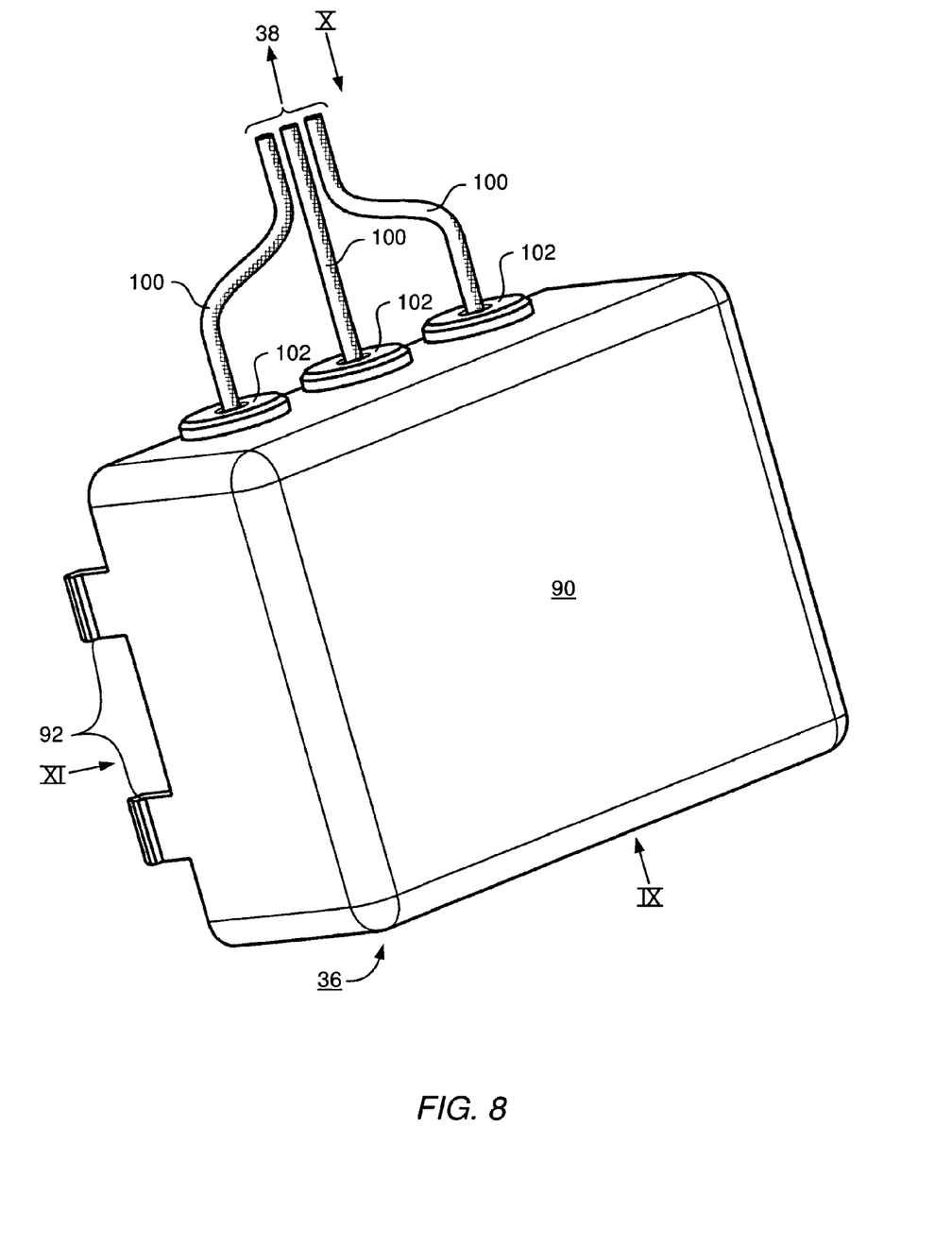
FIG. 8 is an enlarged three-dimensional depiction of switch box 36 that is depicted in FIGS. 1 to 3.

FIG. 8 is an enlarged perspective depiction of switch box 36 of FIG. 1 to FIG. 3. It has a housing cap 90 that is equipped with four resilient tabs 92 with which it is latched into corresponding cutouts of housing part 22.

Switch box 36 contains a central electronic system for all three fans 24, 26, 28, in order to coordinate the fans with one another. This is because it may be the case, in the context of installation in a motor vehicle, that the fans need to operate at different output levels and consequently at different rotation speeds, and an attempt must then be made to operate the fans at different rotation speeds in such a way that troublesome acoustic phenomena are avoided. It may also be necessary to selectively switch off and on one or even more of fans 24, 26, 28, for example via central bus 38 depicted in FIG. 2.

Figure 9:
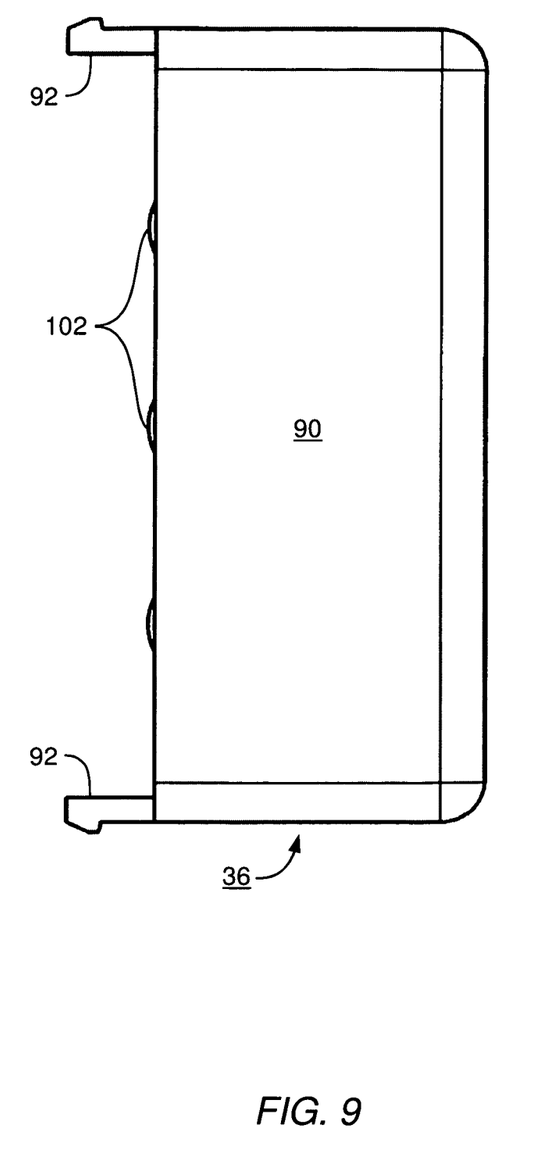
FIG. 9 is a side view looking in the direction of arrow IX of FIG. 8.
Figure 10:
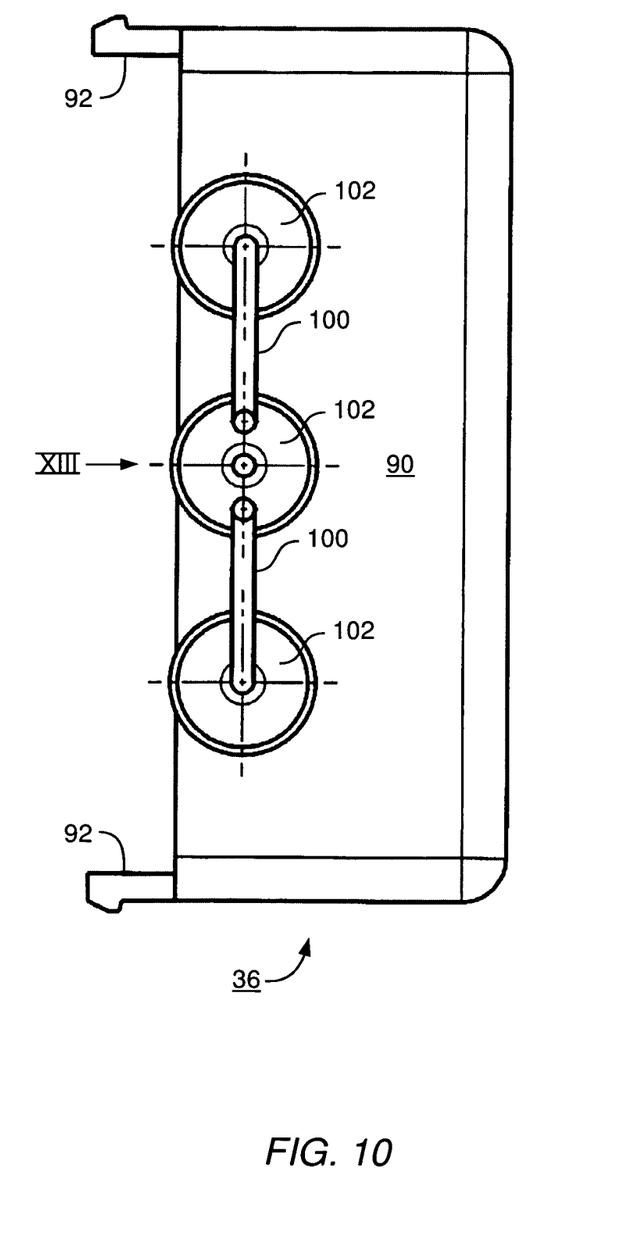
FIG. 10 is a side view looking in the direction of arrow X of FIG. 8.
Figure 11:
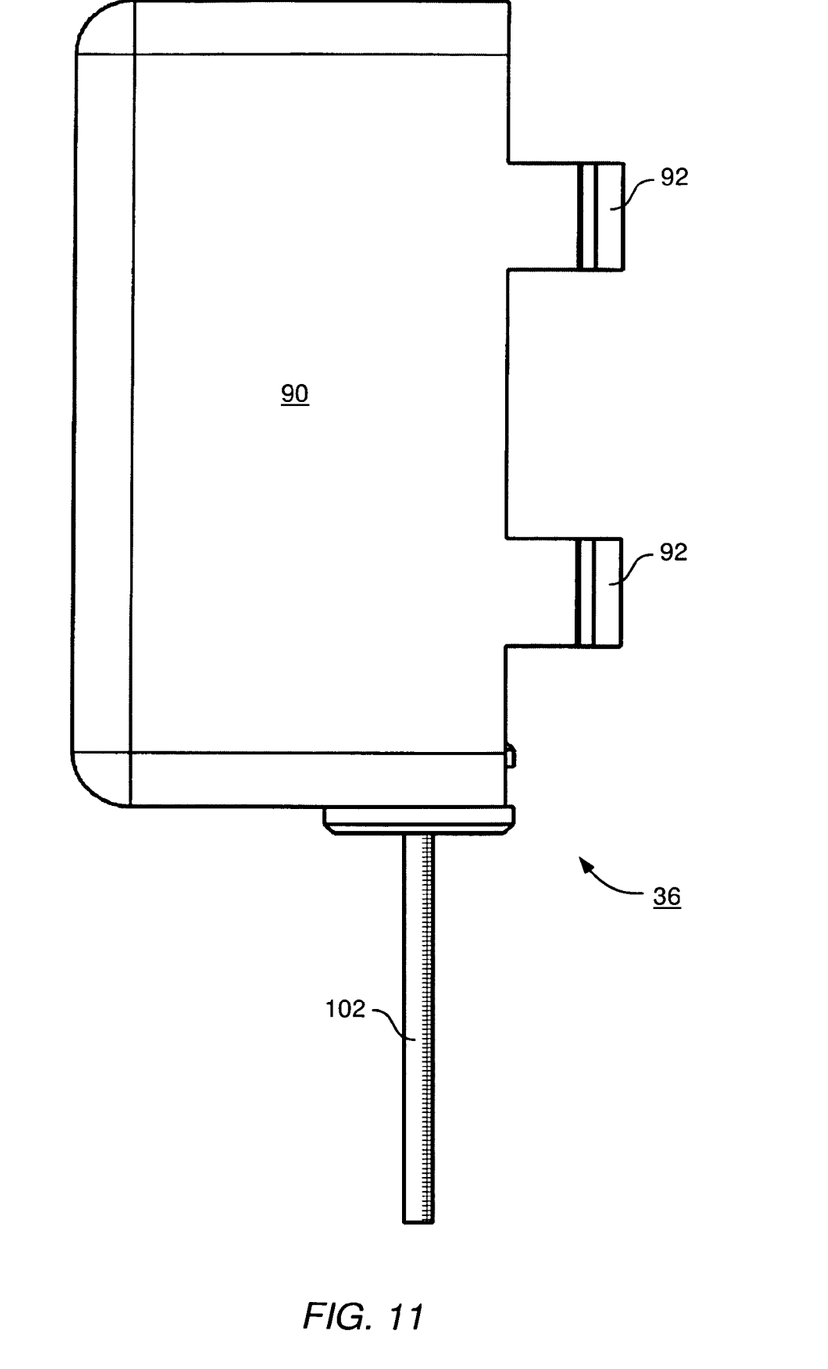
FIG. 11 is a side view looking in the direction of arrow XI of FIG. 8.

FIG. 9 to FIG. 11 are side views of FIG. 8.

Figure 12:
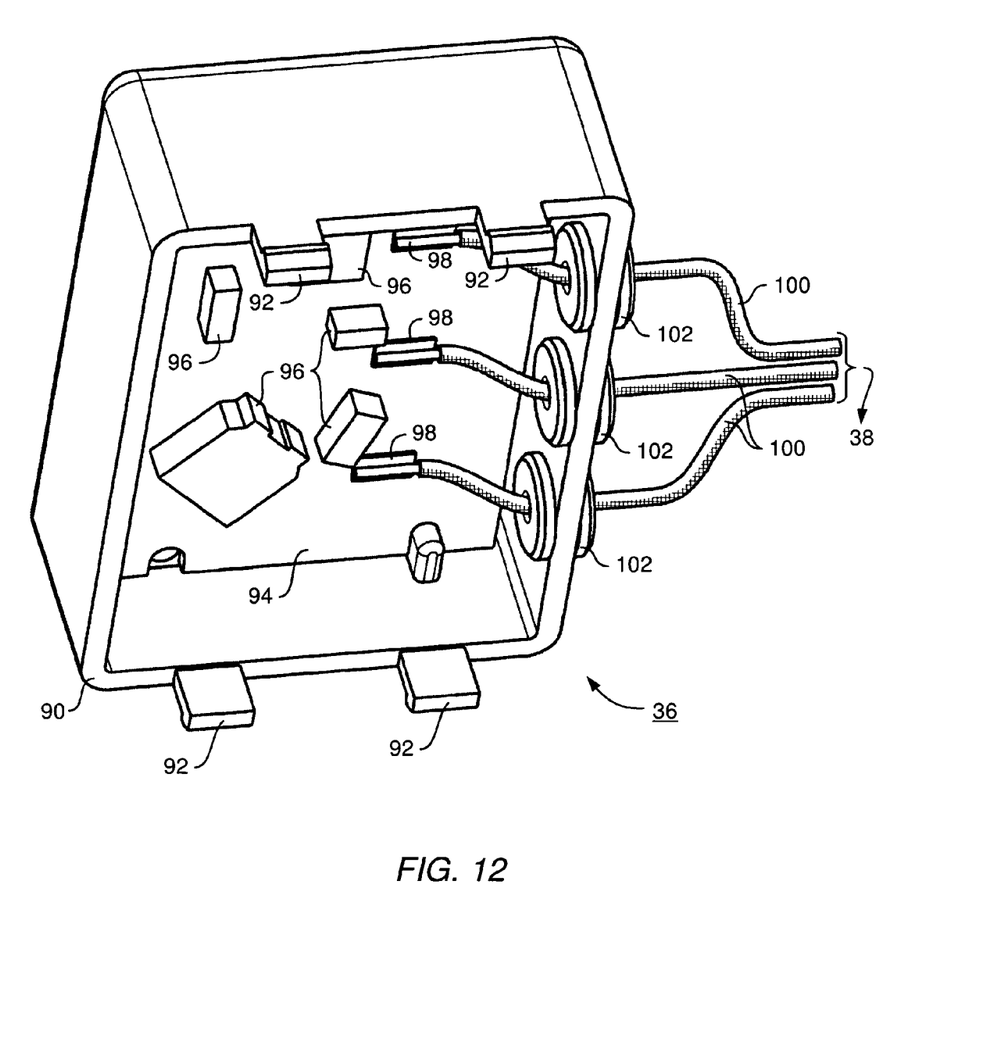
FIG. 12 is a highly schematic three-dimensional depiction of a populated circuit board 94 that is located in switch box 36.
Figure 13:
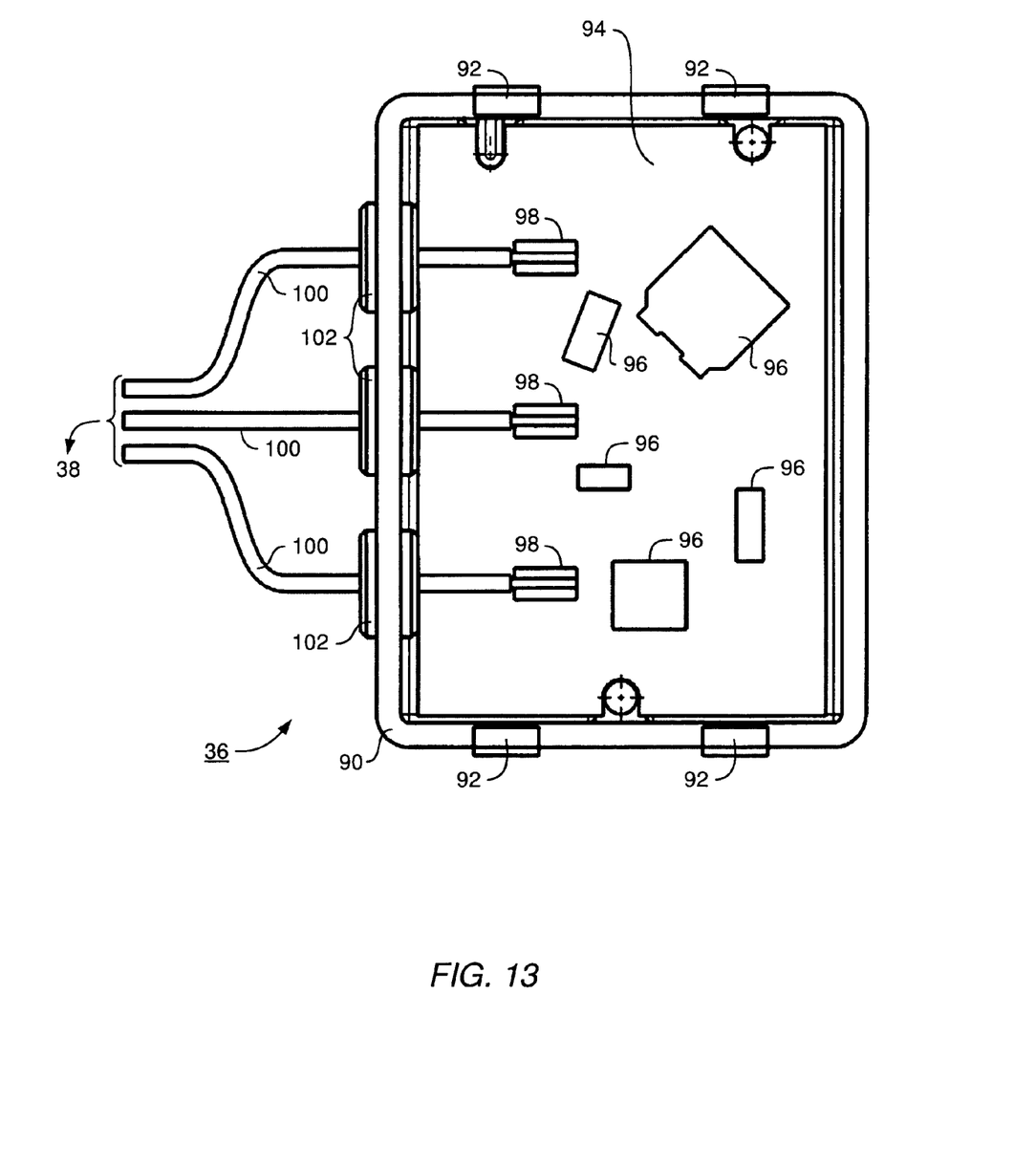
FIG. 13 is a plan view of circuit board 94, analogous to FIG. 12.

FIG. 12 and FIG. 13 show a circuit board 94 on which electronic components 96 are schematically depicted. Also located on circuit board 94 are terminals 98 at which three connecting leads 100 to central bus 38 are attached. Connecting leads 100 are guided in the usual way through seals 102 in the wall of cap 90, in order to prevent moisture from penetrating into switch box 36.

Numerous variants and modifications are of course possible, within the scope of the present invention, in order to adapt the blower arrangement to different three-dimensional shapes.

Instead of three fans, for example, two, four, five, or six fans 22, 24, 26 can also be provided.

Sensors (e.g. for temperature and atmospheric moisture) can be arranged, for example, in second housing part 40.

A separate discharge conduit 47 (FIG. 6) can be associated with each fan or some of the fans, and shared discharge conduits 47 for each two or more fans 22, 24, 26 can also be provided.

Fans 22, 24, 26 and/or switch box 36 preferably have a protection rating that corresponds at least to the IP54 standard, i.e. the first digit "5" meaning that protection against ingress of dust is sufficient to keep dust from interfering with device operation, and the second digit "4" meaning that water splashing against the enclosure from any direction shall have no harmful effect.

What is claimed is:

1. A blower arrangement having n fans, where n>1,
having a housing arrangement (22, 40) for receiving said fans (24, 26, 28), which housing arrangement (22, 40) comprises:
a) a first housing part (22) having flow-through openings (76) that are each associated with one of the fans (24, 26, 28),
and having at least one installation opening (78) through which a fan (24, 26, 28) can be introduced into said first housing part (22) and can be mounted adjacent an associated flow-through opening (76);

b) a second housing part (40) that is connected, on one side, to the first housing part (22) on the side thereof having the at least one installation opening (78), and, on the other side, defines at least one air exit opening (42).

2. The blower arrangement according to claim 1, wherein the first housing part (22) is implemented in wound fashion, at least in portions thereof.

3. The blower arrangement according to claim 1, wherein the fans (24, 26, 28) are equipment fans (24, 26, 28) that each includes a respective associated electric motor to drive it.

4. The blower arrangement according to claim 1, wherein the second housing part (40) is configured for attachment of an air filter (74).

5. The blower arrangement according to claim 1, wherein the second housing part (40) is implemented in wound fashion.

6. The blower arrangement according to claim 1, wherein the fans (24, 26, 28) comprise
fan wheels that are each rotatable around a rotation axis, and the rotation axes (24A, 26A, 28A) of at least some of said fan wheels extend at an angle to one another that is different from parallelism.

7. The blower arrangement according to claim 1, wherein the fans (24, 26, 28) are implemented, at least in part, as radial fans (24, 26, 28) or, at least in part, as axial fans.

8. The blower arrangement according to claim 1, further comprising
an electrical controller adapted to supply electrical power to respective ones of the fans (24, 26, 28) independently of each other.

9. The blower arrangement according to claim 1, wherein at least some of the fans (24, 26, 28) have differing respective resonant frequencies.

10. The blower arrangement according to claim 1, which is arranged adjacent an instrument panel of a motor vehicle, in order to cool electronic devices located there, the wound implementation of the first housing part (22) being adapted to fit within available open space adjacent an underside of the instrument panel.

11. The blower arrangement according to claim 1, wherein at least some of the fans (22, 24, 26) are arranged in the first housing part (22) on an associated base (56, 58, 60).

12. The blower arrangement according to claim 1, further comprising
a shared filter (74), associated with the flow-through openings (76) of at least some of the fans (22, 24, 26).

13. The blower arrangement according to claim 12, in which
a support member (70) for the filter (74) is provided between the filter (74) and the flow-through openings (76).

14. The blower arrangement according to claim 13, wherein
the filter (74) is arranged in a filter housing that is arranged removably on the first housing part (22).

15. The blower arrangement according to claim 12, wherein
the filter (74) is arranged in a filter housing that is arranged removably on the first housing part (22).

16. The blower arrangement according to claim 1, further comprising
in the second housing part (40), a separate discharge conduit (47), associated with at least one of the fans (24, 26, 28).

17. The blower arrangement according to claim 16, wherein
at least one air-directing vane (44, 46) is provided at the outlet of a discharge conduit (47) in order, during operation, to control the volumetric flow rate flowing through said discharge conduit (47).

18. The blower arrangement according to claim 1, wherein n>2.

19. The blower arrangement according to claim 1, wherein the second housing part (40) is configured for attachment of an object to be cooled by airflow from at least one of said fans.

20. The blower arrangement according to claim 19, wherein said object to be cooled is an electrical device.

* * * * *